Patented May 27, 1941

2,243,386

UNITED STATES PATENT OFFICE 2,243,386

COMPOSITION OF MATTER

Robert R. Lewis, Baldwin, and Albert J. Weiss, Mineola, N. Y., assignors to Vulcan Proofing Company, New York, N. Y., a corporation of New York No Drawing. Application August 12, 1940, Serial No. 352,308

9 Claims. (Cl. 260—42)

This invention relates to a process for producing a surface or peripheral layer which is soft, resilient, and resistant to the action of numerous solvents and liquids, such as oils, pyroxylin lacquers and other types of lacquers, varnishes, enamels, etc.

The invention also relates to the surface layer itself, and to an applicator or roller, which may have a body of any suitable soft and resilient material (such as rubber) provided with a surface layer of this type. Such applicator or roller is soft and resilient throughout, and it can be used as an inking roller on a printing press, as a roller in a coating machine for applying lacquer, varnish, enamel, and for similar purposes.

While the invention is not to be limited to the ingredients or proportions specified herein, the following is given as a preferred formula of making said covering.

Formula A

| | Pounds |
|---|---|
| C stage "Glyptal" resin (1353U) | 100. |
| "Bakelite-Glyptal" casting resin (H529) | 12.5 |
| "Duprene" | 15.5 |
| Wood rosin | .75 |
| Pine tar | .2 |
| Magnesium oxide | 1.5 |
| Zinc oxide | .75 |
| Phenyl beta naphthylamine | .35 |
| Soft brown factice | 7.75 |
| Hard brown factice | 7.75 |
| Cottonseed oil | .50 |
| Coumarone resin | 4.75 |
| | 152.30 |

The C stage "Glyptal" resin is the essential ingredient of the mixture. This is a soft rubber-like resin and is one of the resins formed by the interaction of glycerine and polybasic organic acids which have come to be known as "Glyptal" resins or alkyd resins (see Synthetic Resins and Their Plastics, by Ellis, 1923 edition, pages 293–298). In manufacturing the resins which have been found satisfactory for this purpose the reaction is carried out in the presence of adipic acid. (The manufacture of this type of flexible, resilient synthetic resin is disclosed in U. S. Patent No. 1,897,260.) The proportion of adipic acid controls the hardness of the finished product. The resin which we prefer to use for most printing rolls requiring a soft face is designated by the manufacturer, General Electric Corporation, as #1353U and is a mixture of fifteen parts of "Glyptal" resin and one part of adipic acid.

This mixture is suitably reacted with the use of heat, to bring it to the C stage.

The "Duprene" may be prepared by several methods. Some of these methods are described in the "Journal of the American Chemical Society" volume 53, No. 11, page 4203, issued in November, 1931. Other methods are stated in U. S. Patents Nos. 1,950,431, 1,950,432, 1,950,434, 1,950,435, 1,950,436, 1,967,860 and 1,967,861.

This material is referred to technically as chloro-2-butadiene- 1,3, and the polymers thereof. Likewise under the designation "Duprene" we generally include the plastic solids which are derived by polymerizing chloroprene, which is a substitution product of butadiene. The "Duprene" is also described in "Dictionary of Applied Chemistry" by Thorpe, volume 2 of the supplement, pages 333–334, as being formed by polymerizing butadiene and its homologues, such as isoprene.

The compound is mixed on a regulation rubber mill using the following procedure:

The "Duprene" is put on the mill first and brought to a plastic condition. The wood rosin and coumarone resin, which serve as softeners, are first added and thoroughly incorporated into the "Duprene." The magnesium oxide, which serves to stabilize the plastic "Duprene" by neutralizing acidity, is next incorporated. The phenyl beta naphthylamine, which is a stabilizer, and the pine tar, are then added. The pine tar serves to accelerate subsequent polymerization of the "Duprene" and also to mask its odor. Zinc oxide, which serves as the chief accelerator of the subsequent polymerization of the "Duprene," is added next. The two factices and the cottonseed oil are added next. These materials also serve as softeners for the "Duprene." All of these ingredients are thoroughly incorporated with the "Duprene" and the batch is now a soft plastic mass which can be readily handled on a rubber mill by one skilled in the art. This batch is now removed from the mill and set aside while the first two ingredients are mixed together. The casting resin is put on the mill first. This is a mixture of a phenol formaldehyde resin ("Bakelite") and a B stage "Glyptal" resin. It is a soft, sticky mass of about the consistency of soft tar. It is a light reddish tan in color. This material immediately smears all over the mill rolls. The C stage "Glyptal" resin (1353U) which has been previously ground to a uniform powder, is now dumped on the mill. This "Glyptal" resin as made is in the form of rather firm, resilient, almost transparent lumps. By repeatedly passing these lumps through a tight mill they are broken up into a powdery form similar in appearance to white factice which has been ground by similar treatment. The mastication of the mill rolls, which are set tightly together, causes the "Glyptal" resin to be taken up by the casting resin. As the mastication continues the mixture gradually forms a sheet which adheres to the back roll (fastest roll) of the mill. The back roll must be equipped with a scrape knife which is now used to produce a homogeneous mixture. By scraping the sheet off the roll, the entire amount of material is caused to pass through the mill rolls. This process is repeated several times until a uniform product results. The original batch which has been prepared with "Duprene" is now put back on the mill with the "Glyptal" resin mixture and the whole batch is thoroughly milled together until homogeneous. The entire mixture now resembles a rubber compound in its characteristics and it may be milled and calendered in the same manner as a rubber compound.

The incorporation with the "Glyptal" of the "Duprene" and the other materials, serves very important purposes in the roll as finally manufactured. A roller can be made from the "Glyptal" resin and casting resin alone but such a roll has several serious shortcomings. Its oil and solvent resistance are splendid, much greater than the resistance of rubber, but its stability and mechanical resistance are very poor. It is very low in abrasion resistance, shearing resistance and tensile strength. In other words, it would be seriously damaged by impact with sharp raised surfaces on a press. It would be unstable in the presence of heat and moisture and liable to break down suddenly into a sticky mass, having no serviceability whatsoever. The "Duprene" serves to stabilize the "Glyptal" resin. It strengthens and toughens the mixture and stabilizes it so that the above-mentioned danger of dejelling no longer exists. The C stage alkyd resins readily depolymerize and the "Duprene" stabilizes the unstable alkyd resin.

The mixture made in accordance with the description given above is now calendered in preparation for its application as the cover of a roll, such as a printer's roll. It is calendered on a regular three roll calender to any desired width and thickness. We prefer a thickness of about .040 to .050 inch run in one ply. If greater thickness is desired, it may be plied up in the regular manner to any desired thickness. As the mixture comes from the calender, it is wrapped in a clean cloth liner.

Rollers may be covered with this "Glyptal" "Duprene" mixture (Formula A) for the entire depth of coverage, down to the metal core, or a base of soft rubber may be applied first, and then a thin layer of Formula A applied as an outside face covering, which is about one eighth of an inch thick. The latter procedure is desirable in most cases because of lower cost and greater softness.

If the entire roll covering is made from Formula A, the metal core is prepared by first cleaning it with a sand blast and then applying a brush coat of a "Bakelite" lacquer. The covering is then wrapped tightly around the core spirally, until the diameter is at least one quarter inch greater than the finished diameter desired. Kraft paper is wrapped around the roll and a sheet of galvanized iron is then tightly applied, held in place with spiral wrapping of narrow fabric tape. The roll is then heated in an atmosphere of hot air at a temperature of 300° F. for two hours. This heat treatment cures the chloroprene polymer, in the well-known manner. After cooling, the roll is then buffed in a lathe to the finished diameter desired, and polished with fine emery cloth.

If only the surface stock is to be made from Formula A, it is necessary to first cover the roll with rubber. The following rubber compound serves as a satisfactory base compound for soft rolls. This compound may be varied to produce rolls of different firmness.

*Formula B*

| | Pounds |
|---|---|
| Smoked sheet rubber | 50.0 |
| Coumarone resin | 16.5 |
| Zinc oxide | 2.5 |
| Soft brown factice | 15.0 |
| Phenyl beta naphthylamine | .5 |
| Sulphur | 3.0 |
| Stearic acid | .5 |

This compound is milled and calendered in the conventional manner in preparation for building the roll. The metal core is cleaned by sandblasting and one ply of rubber compound which will vulcanize hard, is applied to bond said ply firmly to the core. Sheets of Formula B calendered to a thickness of about .075" are then wrapped in the form of a spiral around the core, until the diameter is about equal to the finished diameter desired. A layer of paper is then applied, followed by the application of a sheet of galvanized iron which is tightly wrapped and held in place with spiral wrappings of narrow fabric tape. The rubber is then vulcanized by heating the compound at a temperature of 278° F. for four hours. After cooling, the roll is buffed in a lathe to a diameter one quarter inch less than the finished diameter desired, and the ends are buffed down to the core to give a length one inch less than the finished length desired. The surface is then painted with a solution of a fast curing, tacky rubber compound. After the solvent has evaporated, the surface covering is applied, using material made in accordance with Formula A. The same procedure is used as that outlined in covering a roll without the rubber base, except that the ends must be covered with Formula A to prevent the oils and solvents from attacking the rubber. Printing ink usually contains linseed oil varnish, which attacks rubber. The ends are covered in the following manner. A strip of hard cured rubber one half inch wide is applied on each end. A strip of Formula A which is one inch wide, is then wrapped on each end, until the diameter is built up to the diameter of the rubber base. The entire surface is then built up to a diameter which is one quarter inch greater than the finished diameter which is desired. The roll is wrapped as described above, and heated for two hours at 300° F. After cooling, the roll is buffed in a lathe to the desired length and diameter.

The procedure outlined above, using a rubber base, will produce a roll which will have a hardness of about 21 as determined by the Shore durometer. A roll which is built up solid from the core, without a rubber base, will have a Shore hardness of about 25. The softer roll will be more desirable for some kinds of typographic printing but the harder roll will suffice for printing from planographic plates and for some of the typographic printing. The harder roll will also suffice for use as a coating machine roller where no indented surfaces are encountered or it will serve as an inking roller for use with intaglic plates.

The proportion of the various softening ingredients which are incorporated with the "Duprene" influences the hardness to some extent, but as stated above, the hardness of the C stage "Glyptal" resin primarily determines the hardness of the finished roll. The Shore hardness test stated above is about the lowest reading that can be obtained, but it is possible to increase this hardness to any extent desired.

In order to give practical examples of all the features of our invention, suitable formulas for the hard rubber base and for the cementing compounds are as follows:

*Formula for hard rubber base*

|  | Pounds |
|---|---|
| Smoked sheet | 42.5 |
| Zinc oxide | 35 |
| Sulphur | 22.5 |
| Whole tire reclaim | 15 |
| Carbon black | 5 |
| Tetramethylthiuram monosulphide | 1.25 |

*Formula for fast curing tacky rubber compound which bonds the surface compound to the rubber base*

| Smoked sheet | 52 lbs. 10 oz. |
|---|---|
| Coumarone resin | 25 lbs |
| Sulphur | 2 lbs. 3 oz. |
| Zinc oxide | 5 lbs. |
| Whiting | 10 lbs. |
| Lithopone | 10 lbs. |
| Tetramethylthiuram monosulphide | 3¾ oz. |
| Trimene base | 8 oz. |

The completed coating material, prior to the heat treatment, is plastic, and it resembles unvulcanized rubber in its physical properties. That is, the unheated compound can be readily calendered so as to form a tough and coherent layer or sheet of material which can be handled and applied in the dry form and without using any solvents.

We do not wish to be limited to the use of all of the ingredients above mentioned, in making the protective layer or coating, as a number of the ingredients mentioned in Formula A can be omitted without departing from the invention, since said formula is intended to represent the best embodiment of the invention.

It will be noted that the "Duprene" which is referred to in Formula A is added to the remainder of the compound prior to the final curing or polymerization thereof. This polymerization is produced by the zinc oxide, during the heat treatment which was previously mentioned.

For the purpose of conveniently defining the invention in the claims, we have described the improved product as a compound. However, it does not necessarily follow that there is any actual chemical interaction between the ingredients specified in Formula A.

We do not wish to be limited to the use of magnesium oxide, as any suitable ingredient which has a basic reaction can be employed.

Whenever we refer to "Glyptal" resin, it is understood that we are not limited to the specific use of "Glyptal" resin which is set forth in Formula A.

The "Duprene" is also designated as "Neoprene." Instead of using either "Duprene" or "Neoprene" to stabilize the alkyd resin and to prevent it from depolymerizing, we can also use the synthetic rubber which is known in the trade as "Perbunan." This is described in "Rubber Chemistry and Technology," issue of January, 1937, beginning at page 17. This is a synthetic rubber which is a co-polymer of butadiene and vinyl cyanide. Vinyl cyanide is also known as acrylo nitrile. Both "Neoprene" and "Perbunan" are members of the group which consists of polymerized butadiene and its homologues and its substitution products. The method of handling the "Perbunan" is the same as the method of handling the "Duprene" or "Neoprene," and the same proportions can be used. The "Perbunan" is also made by polymerizing butadiene and its homologues such as isoprene. These polymerized synthetic rubbers are more resistant to oils and greases than natural rubber.

This application is a continuation in part of application Serial No. 688,584 filed in the United States Patent Office on September 8, 1933, and of Serial No. 231,180, filed on September 22, 1938.

The substances which stabilize the alkyd resin may be designated as being polymerized butadiene or a polymerized homologue or derivative of butadiene. The stabilizing ingredient is heat-cured in situ and it is in sufficient proportion to stabilize the C alkyd resin. This C stage alkyd resin is made by heating the so-called "green" alkyd resin for a long period, about two weeks, in order fully to polymerize this "green" resin.

The materials designated as "Duprene" or "Neoprene" and "Perbunan" are stabilizing substances for the soft rubber-like alkyd resin, which are selected from a group which includes polymerized 2-chlorobutadiene 1,3 and which consists of polymerized butadiene and its homologues and its substitution products. These stabilizing substances can be heat cured.

When "Perbunan" is used as the stabilizing binder, accelerators such as mercapto-benzo-thiazole or di-ortho-tolylguanidine, activators such as zinc oxide, and vulcanizing agents such as sulphur can be used. The stabilizing binder can also include the material known as "Thiokol," which is a synthetic plastic made by reacting sodium polysulfide and dichlorethylene. Natural rubber alone, or "Thiokol" alone, will not stabilize the C stage alkyd resin, so as to prevent it from depolymerizing. This composition of matter remains stable for at least one year, and it provides an improved gas-proof and water-proof coating on materials used for making gas-masks, balloons, etc.

The resistance to dejelling is determined by subjecting the cured mixture of the alkyd resin and the stabilizing ingredient to the action of steam at a pressure of about 5 lbs. per sq. inch. This cured mixture consisted of the alkyd resin and "Neoprene" together with the curing ingredients for the "Neoprene" and the plasticizer. A composition which has been thus tested had about 75% of the alkyd resin and the "Neoprene," and the remainder of the composition consisted of said other ingredients. The plasticizer comprised about 8% of the mixture. "Neoprene" has a much superior stabilizing effect than "Perbunan." The stabilizing effect of the "Neoprene" becomes substantially operative when the proportion of the "Neoprene" is about 10% of the alkyd resin and the "Neoprene." This stabilizing effect remains substantially uniform, as the proportion of the "Neoprene" is made equal to that of the alkyd resin, so that the composition then has equal weights of the alkyd resin and the "Neoprene." Upon increasing the percentage of "Neoprene" from 50% to 60% of the sum of the weights of the alkyd resin and the "Neoprene," a very sharp increase in resistance to dejelling is observed, and the resistance is at its substantial maximum when the proportion of the "Neoprene" is 60% of the total weight of the alkyd resin and the "Neoprene."

It is desirable that the swelling of the composition in coal-tar solvents, such as toluol, should be a minimum. This swelling increases as the proportion of "Neoprene" is increased from 10% to 40% of the total weight of the alkyl resin and the "Neoprene," but this increase is very slight. There is a slight, but not objectionable increase in the swelling, when the percentage of "Neoprene" is increased up to 60% of said total weight.

The flexibility of the material is at a substantial maximum when the "Neoprene" is about 50% of said total weight, and said flexiblity decreases sharply when the percentage of "Neoprene" is increased to 60% of said total weight.

Hence, for many purposes where great flexibility is desired, the proportions of "Glyptal" and "Neoprene" should be substantially equal.

The resilience of the material is substantially constant when the proportion of "Neoprene" is from 10% to 50% of said total weight of the "Neoprene" and the alkyd resin. The resilience increases as the percentage of "Neoprene" is increased, there being a sharp increase in resilience as the percentage of "Neoprene" is increased from 50% to 60% of said total weight.

Therefore, we include in the invention, compositions which have equal proportions of the alkyd resin and "Neoprene," and compositions in which the percentage of "Neoprene" is as high as about 60% of the total weight of the alkyd resin and the "Neoprene."

The hardness of the composition, as measured by the Shore test, is about the same as the percentage of the "Neoprene" is from 10% to 80% of said total weight, and the hardness then increases abruptly.

Whenever we refer to the resistance of the improved material to coal-tar solvents, this is merely to identify the composition conveniently, as this test may not correspond to all actual service conditions, although the use of the material may subject it to the action of toluol and other coal-tar solvents.

We claim:

1. A heat-cured composition of matter which is more resistant than rubber to the solvent action of oils which are used in printing inks, said composition having a major proportion of an alkyd resin which is unstable in the presence of heat and moisture, said composition also having a minor proportion of a rubber-like stabilizing subtance for said resin, selected from the group consisting of stabilizing polymerized butadiene and its stabilizing homologues and its stabilizing substitution products intimately intermixed with said resin, said stabilizing substance being resistant to said oils.

2. A heat-cured composition of matter which is more resistant than rubber to the solvent action of oils which are used in printing inks, said composition having a major proportion of an alkyd resin which is unstable in the presence of heat and moisture, said composition also having a minor proportion of a rubber-like stabilizing substance for said resin, selected from the group consisting of stabilizing polymerized butadiene and its stabilizing homologues and its stabilizing substitution products intimately intermixed with said resin, said stabilizing substance being resistant to said oils, said composition also containing a minor proportion of a mixture of a phenol aldehyde resin and of an alkyd resin, said last-mentioned mixture being intimately distributed throughout the composition and being soft and sticky prior to said heat-curing.

3. A heat-cured composition of matter which is more resistant than rubber to the solvent action of oils which are used in printing inks, said composition having a major proportion of an alkyd resin which is unstable in the presence of heat and moisture, said composition also having a minor proportion of a rubber-like stabilizing substance for said resin, selected from the group consisting of stabilizing polymerized butadiene and its stabilizing homologues and its stabilizing substitution products intimately intermixed with said resin, said stabilizing substance being resistant to said oils, said composition also having a minor proportion of a mixture of a phenol aldehyde resin and a B-stage alkyd resin, intimately intermixed with the other ingredients of said composition.

4. A method of producing a resilient and stable composition of matter which is more resistant than rubber to the solvent action of oils which are used in printing inks, which consists in intermixing a major proportion of an alkyd resin which is unstable under the action of heat and moisture with a minor proportion of a rubber-like stabilizing substance for said resin, selected from the group consisting of stabilizing polymerized butadiene and its stabilizing homologues and its stabilizing substitution products, said rubber-like stabilizing substance being resistant to said oils, said substances being thus intermixed prior to heat-curing and then heat-curing the solid mixture.

5. A method of producing a resilient and stable composition of matter which is more resistant than rubber to the solvent action of oils which are used in printing inks, which consists in intermixing a major proportion of a C-stage alkyd resin which is unstable under the action of heat and moisture with a minor proportion of a rubber-like stabilizing substance for said resin, selected from the group consisting of stabilizing polymerized butadiene and its stabilizing homologues and its stabilizing substitution products, said rubber-like stabilizing substance being resistant to said oils, said substances being thus intermixed prior to heat-curing and then heat-curing the solid mixture.

6. A method of producing a stable composition of matter which consists in intermixing a major proportion of a solid C-stage alkyd resin which is unstable under the action of heat and moisture, with a minor proportion of a rubber-like stabilizing substance for said alkyd resin, selected from the group consisting of stabilizing polymerized butadiene and its stabilizing homologues and its stabilizing substitution products, and also with a minor proportion of a solid and spreadable mixture of a B-stage alkyd resin and of a phenol-aldehyde resin, and then heat-curing the mixture.

7. A heat-cured composition of matter which is more resistant than rubber to the solvent action of coal-tar solvents, said composition having a minor proportion of an alkyd resin which is unstable under the action of heat and moisture, said composition also including a rubber-like stabilizing substance for said resin, said stabilizing substance being selected from the group consisting of stabilizing polymerized butadiene and its stabilizing homologues and its stabilizing substitution products, said stabilizing substance being intimately intermixed with said resin, said stabilizing substance being resistant to said coal-tar solvents, the proportion of said stabilizing substance not substantially exceeding 60% of the total weight of said alkyd resin and of said stabilizing substance.

8. A heat-cured composition of matter which is more resistant than rubber to the solvent action of coal-tar solvents, said composition including an alkyd resin which is unstable in the presence of heat and moisture, said composition also including a rubber-like stabilizing substance for said resin, said stabilizing substance being selected from the group consisting of stabilizing polymerized butadiene and its stabilizing homologues and its stabilizing substitution products, said stabilizing substance being intimately intermixed with said resin, said stabilizing substance being resistant to said coal-tar solvents, the percentage of said stabilizing substance in said composition being substantially from 10% to 60% of the total weight of said resin and of said stabilizing substance.

9. A heat-cured composition of matter which is more resistant than rubber to the solvent action of coal-tar solvents, said composition including an alkyd resin which is unstable in the presence of heat and moisture, said composition also including polymerized chloro-2-butadiene-1,3, the percentage of polymerized chloro-2-butadiene-1,3 being substantially from 10% to 60% of the total weight of the alkyd resin and the polymerized chloro-2-butadiene-1,3.

ROBERT R. LEWIS.
ALBERT J. WEISS.